United States Patent

[11] 3,525,354

| [72] | Inventor | Bloys D. Parrish<br>1012 Matthews Drive, Cincinnati, Ohio 45215 |
|---|---|---|
| [21] | Appl. No. | 750,993 |
| [22] | Filed | Aug. 7, 1968 |
| [45] | Patented | Aug. 25, 1970 |

[54] LIQUID LEVEL CONTROL DEVICE
13 Claims, 6 Drawing Figs.

[52] U.S. Cl. .................................................. 137/421,
137/428, 137/429, 126/113
[51] Int. Cl. ................................................ F16k 31/24
[50] Field of Search .......................................... 137/185,
403, 404, 409, 416, 420, 421, 422, 428, 429;
251/75; 73/322.5; 126/113

[56] References Cited
UNITED STATES PATENTS

| 1,896,528 | 2/1933 | Strong | 137/185 |
| 2,560,090 | 7/1951 | Crow | 251/75X |
| 3,016,892 | 1/1962 | Sperath | 126/113 |
| 3,049,010 | 8/1962 | Holderith | 73/322.5 |

*Primary Examiner*— M. Cary Nelson
*Assistant Examiner*— David R. Matthews
*Attorney*— Warren J. Kinney, Jr.

ABSTRACT: The liquid level control device includes a float having a variable ballast, and means cooperating therewith to minimize movement and wear of a liquid inlet valve which controls a flow of liquid to a float tank and an auxiliary tank connected thereto. The inlet valve never operates in a cracked condition such as might wear and injure the seats thereof, and no small orifices subject to clogging are employed. All vital parts are protected from atmospheric dirt and other foreign substances.

Patented Aug. 25, 1970
3,525,354
Sheet 1 of 2
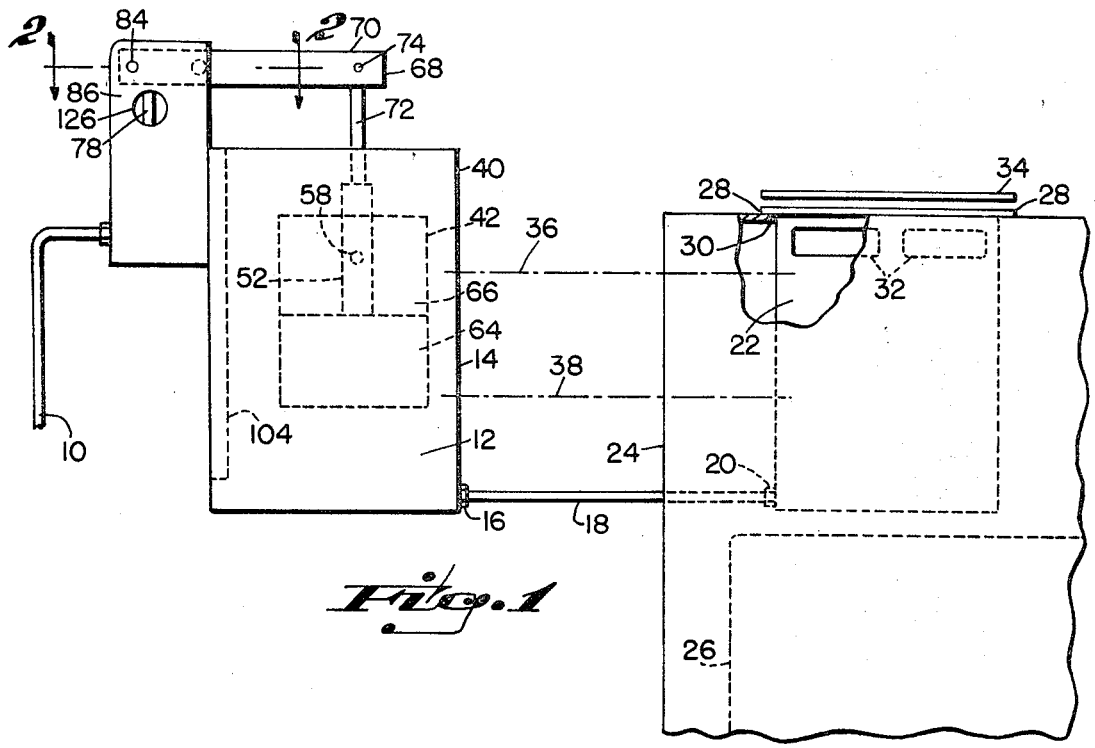
Fig. 1
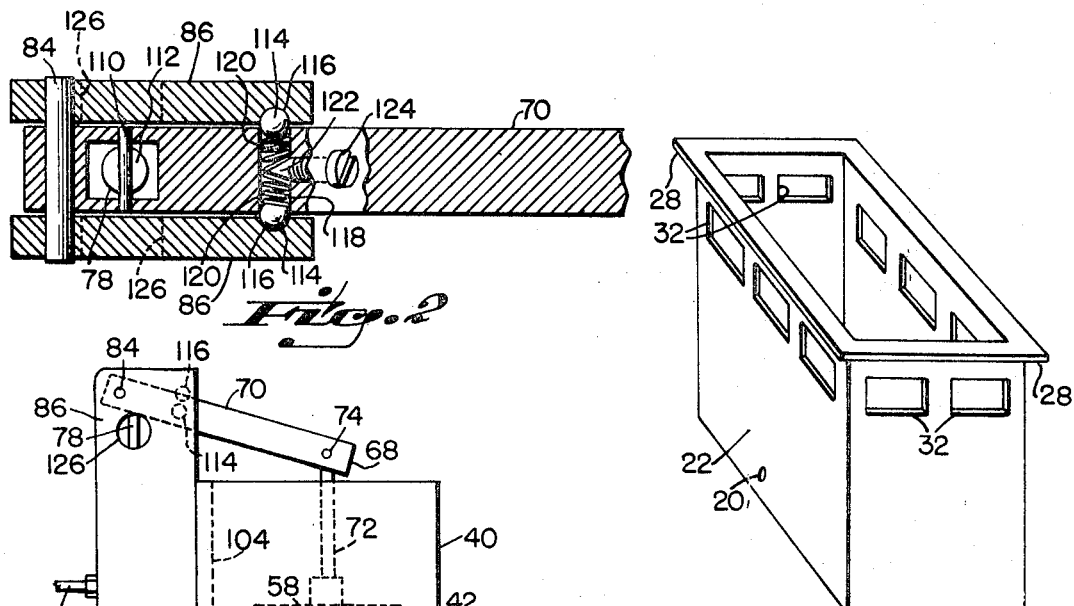
Fig. 2
Fig. 3
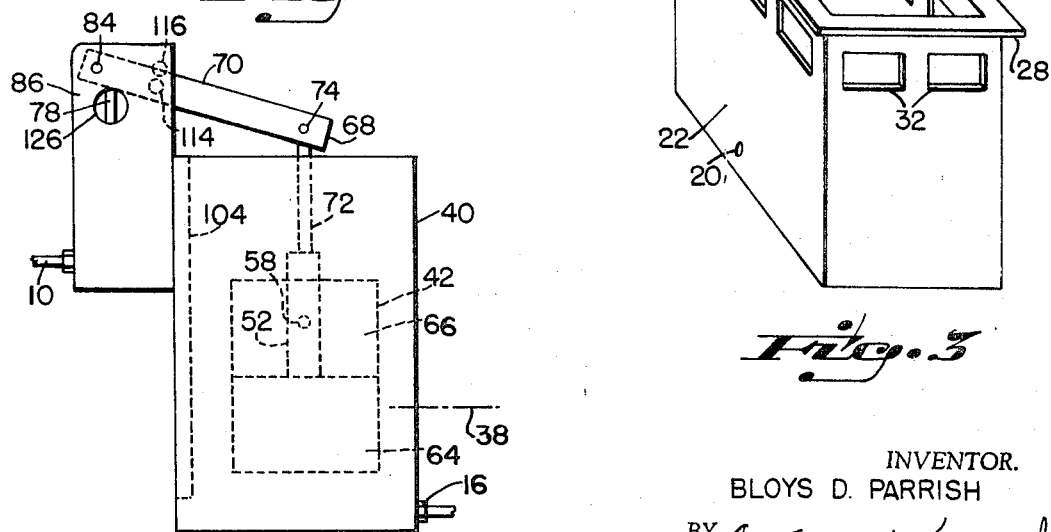
Fig. 4
INVENTOR.
BLOYS D. PARRISH
BY J. Warren Kinney, Jr.
ATTORNEY

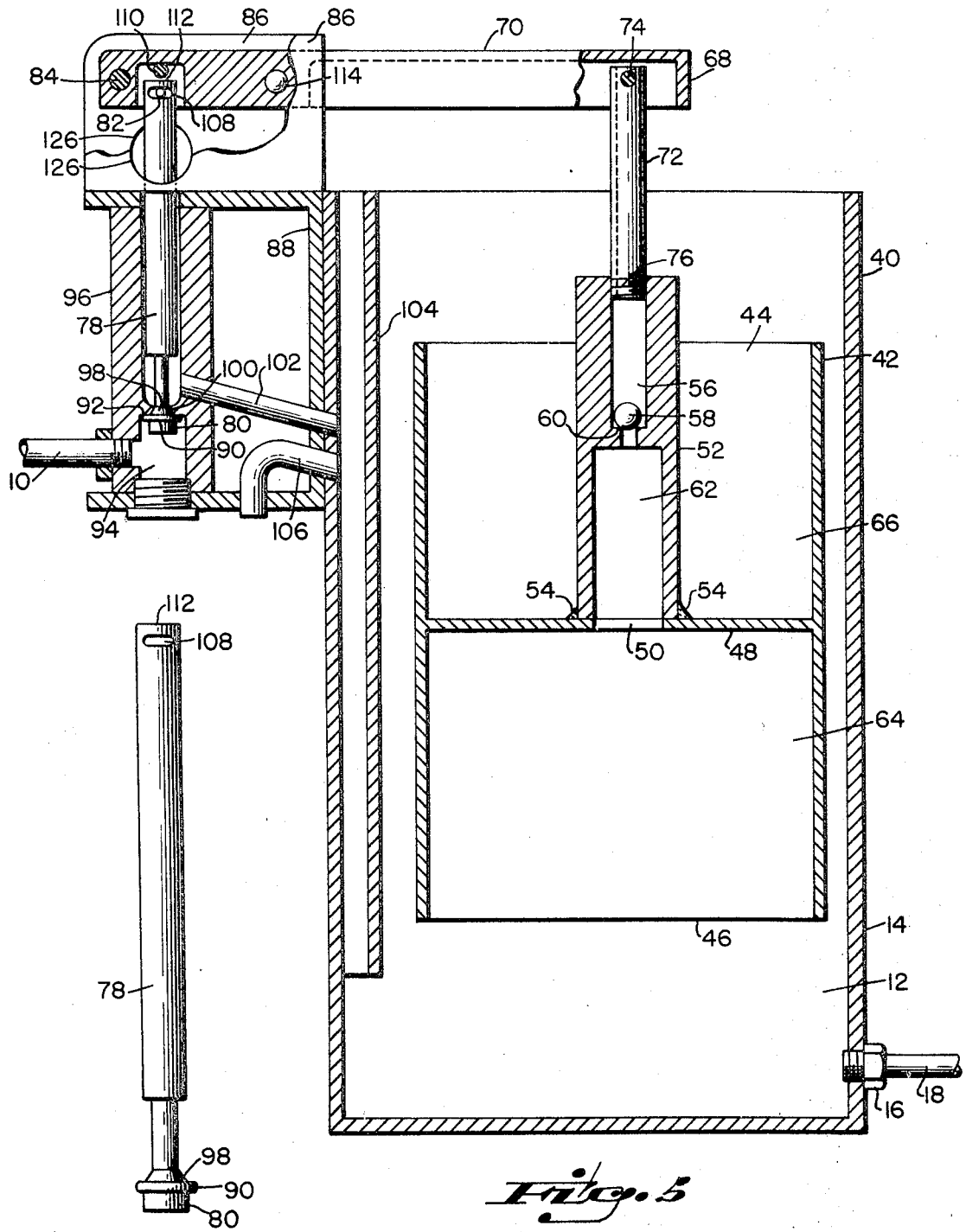

LIQUID LEVEL CONTROL DEVICE

The present invention relates to a liquid level control device, such as may be used for control of the water level in humidifiers, or reservoirs of various kinds. Without any intention to limit the uses of the present device, it is herein disclosed by way of example, as a control for the level of water in a humidifier tank applicable to space heating equipment and the like.

In air humidifying equipment, it has been common practice to provide a water pan generally subject to heating, from which water is vaporized more or less continuously so as to require continuous replenishment of the supply of water within the pan. The water feed to the pan is usually under the control of a float controlled valve, which operates to admit fresh water to the pan as the level of water therein diminishes due to vaporization. Such prior devices have not performed satisfactorily, for several reasons. The small orifices, or valves sometimes employed, were highly vulnerable to stoppage by scale or corrosion, after a relatively short period of use. Also, wear of the valve seats was often excessive, due to the valve being only partly open, or cracked most of the time, and with a substantially continuous movement of parts occurring during operation of the device.

An object of the present invention is to provide a liquid level control device in which the feed valve thereof operates at infrequent intervals of time, with a minimum of wear, to maintain a liquid at a satisfactory level between upper and lower limits.

Another object of the invention is to provide a device of the character stated, whose feed valve will be either fully closed or fully open during its operating cycle, thereby to minimize wear of parts and the likelihood of scale or corrosion accumulating at the valve seats or other passageways within the valve.

Another object of the invention is to enhance substantially, the dependability of operation of a liquid level control device, and to provide operating means therefor which requires minimal maintenance attention.

A further object is to provide a device of the character stated, which may be applied with ease to circulating air heating equipment, to humidify the circulated and heated air with great efficiency and economy.

Another object of the invention is to provide a device of the character stated, which is completely automatic and requires no electrical controls.

The foregoing and other objects are attained by the means described herein and illustrated upon the accompanying drawings, in which:

FIG. 1 is a side elevational view of the control device of the invention, shown applied to an air heater or furnace, for humidifying the air passing therethrough.

FIG. 2 is an enlarged fragmental cross-section taken on line 2–2 of FIG. 1.

FIG. 3 is a perspective view of a vaporizing tank or batch receptacle forming a part of the FIG. 1 assembly.

FIG. 4 is a side elevation of the control device of FIG. 1, shown in condition to replenish its float chamber with liquid lost through the vaporizing tank.

FIG. 5 is a vertical section through the control device, in the replenished condition of FIG. 1.

FIG. 6 is an enlarged detail view of a valve member shown in FIG. 5.

Referring to FIG. 1, the numeral 10 indicates a water supply pipe for feeding water, at infrequent intervals of time, to the float chamber 12 of the control device 14. If the control device is to supply water to a humidifier, a lower water outlet 16 with a pipe 18 connected thereto makes connection with a water inlet port 20 near the bottom of a vaporizing tank or batch receptacle 22 located within the upper portion or bonnet of a furnace or air heater casing 24, FIG. 1. The reference numeral 26 denotes a combustion chamber or fire box over which the receptacle 22 may be supported, for heating and evaporating or vaporizing the water within the receptacle.

The vaporizing tank 22 has a bottom and four side walls, and at the upper edge of each side wall may be provided an outwardly directed flange 28 to overlie the margin of an opening 30 formed in the top wall of the heater casing 24. The flanges thereby suspend the vaporizing tank over the fire box or combustion chamber 26, the heat from which converts the tank water to vapor or steam, depending upon the temperature of the fire box or combustion chamber. The vapor or steam may leave tank 22 through a series of large upper openings 32 in the side walls of the tank, to mix with and humidify a current of air moving within the bonnet of the furnace. The tank 22, though shown as rectangular, may be cylindrical or of any other acceptable shape, and will be provided with a suitable cover 34.

In a typical installation, of which FIG. 1 is an example, the liquid level control device 14 is supported upon a wall or other stationary structure, so that a predetermined level of liquid as represented by broken line 36, will always be present within chamber 12 and receptacle 22 by reason of the open pipe connection 18. The liquid level 36 is the maximum level, or upper limit, and may be located a short distance beneath the receptacle openings 32. In chamber 12, the upper limit may be somewhat closer to the open top of the chamber, than to the bottom wall thereof.

From the upper level 36, the liquid in receptacle 22 and chamber 12 may drop to a lower or minimum level, for example as indicated by the broken line 38 of FIG. 1. When the minimum level of liquid is reached, due to evaporation of liquid from receptacle 22, the control device will respond by opening a valve to admit liquid from pipe 10 to chamber 12, until the level of liquid in the chamber and in receptacle 22 reaches the upper or maximum limit 36, when the supply automatically will be shut off by the supply valve.

Referring now to FIG. 5, the control device comprises an open-topped float tank 40 providing the chamber 12, wherein is suspended a float member 42. Float member 42 may be a cylindrical structure having an upper open end 44 and a lower open end 46, with a dividing wall 48 located about midway between said open ends. The dividing wall has a central opening 50 over which is fixed an upstanding elongate valve body 52, sealed thereto at 54 against leakage of liquid into the upper compartment of the float member.

Valve body 52 may be in the form of a hollow cylinder of plastic or other suitable material, bored at 56 to loosely accommodate a ball valve 58 which rests normally upon a seat 60. A bore 62 beneath seat 60 provides an air chamber in communication with the lower float compartment 64, through opening 50. The upper float compartment is designated 66, and is wholly devoid of communication with the lower compartment 64 and the interior of valve body 52.

The entire float assembly is pivotally suspended from the free end 68 of a rocker arm 70, as by means of a short pipe section 72 having its upper end pivoted at 74 upon the arm 70, and its lower end 76 screw-threaded into the upper end of valve body bore 56. The pipe section serves to vent the bore 56 to atmosphere in the region of pivot 74, and the open upper end of the pipe section 72 is hooded by an overlying portion of arm 70 to preclude entry of dirt or other foreign substances into the seat area of valve ball 58. Ball 58 is not buoyant in water, and may be formed of any suitable material, such as metal.

The means for charging the float chamber 12 with water, comprises the water supply pipe 10 and a longitudinally shiftable valving member 78, one end of which carries a valve head 80 and the opposite end of which has a pivot connection at 82 with rocker arm 70. Arm 70 may rock upon a pivot pin 84 which has opposite ends journalled in two parallel upstanding plates 86, 86 forming part of a bracket 88 fixed to the float tank.

Valve head 80 carries a resilient O-ring 90 to seal against a valve seat 92 provided in the bore 94 of a valve body 96 fixedly supported on bracket 88. A secondary seat 98 on the valve head may seal against a stationary seat 100 of bore 94, in the event of failure of the O-ring to seal against its seat 92, to shut off the water supply. Whenever the valve head 80 is shifted downwardly from seats 92 and 100, resulting from a downward swinging of arm 70 (FIG. 4), water flows through the valve to a passageway 102 and discharges into float chamber 12 along an upstanding stationary baffle plate 104 which prevents turbulence within the float chamber. The passageway 106 beneath passageway 102, is an overflow passageway which may come into use in the event of a failure of valve member 78 to shut off the water supply at a predetermined upper level within the float chamber.

The pivot pin 82 at the upper end of valving member 78, has its opposite ends fixedly supported in the sides of rocker arm 70 so as to move with said arm. Said pin 82 extends loosely through an elongate hole 108 formed transversely in the upper end portion of valving member 78. The loose connection thereby provided ensures that valve 90 will seat freely when rocker arm 70 is in the raised position of FIG. 5. Unseating of the valve 90 is assisted by a second pin 110 which overlies the flat upper end 112 of valving member 78. Pin 110 is parallel to pin 108, and has its opposite ends anchored in the sides or rocker arm 70. As will be understood, a lowering of the free end of rocker arm 70 about its pivot 84, will cause pin 110 to engage the upper end of valving member 78 and impart downward movement thereto for unseating the valve 90.

It is important to note that rocker arm 70 when disposed in the elevated position of FIG. 5, is yieldingly held in that position by a restraining means, herein disclosed by way of example, as a pair of spring-loaded balls 114, 114 (FIG. 2).

The balls are adapted to seat in sockets 116, 116 formed in the stationary plates 86, 86, under the urging of spring means located behind the balls and within the transverse bore 118 of rocker arm 70. The spring means for yieldingly extending the balls into sockets 116, 116, may be a single compression spring, if desired, or it may comprise two springs 120, 120 arranged in tandem relationship, with a force adjusting means disposed between the inner ends of said springs. Thus, as in FIG. 2, the force of springs 120, 120 may be increased when necessary, by driving between the inner ends of the springs the wedge-shaped end 122 of an adjusting screw 124 carried by arm 70.

The sockets 116, 116 are so located upon plates 86, 86 that the balls 114, 114 will yieldingly project into the sockets when the rocker arm is in the elevated position of FIG. 5, thereby tending to hold the arm in that position. However, under the influence of sufficient force tending to lower the rocker arm about its pivot 84, the balls will be displaced by the wedging action of the sockets, permitting the arm to drop to the FIG. 4 position while the balls ride upon the flat inner faces of stationary plates 86, 86 without materially opposing movement of the rocker arm. Upon subsequent raising of the rocker arm to maximum height, the balls will snap into the sockets 116 and tend to hold the arm at the maximum height position.

The circular openings 126, 126 provided in the stationary upstanding plates 86, 86, expedite and facilitate assembly and disassembly of the inlet valve structure.

The operation of the device is as follows.

Assuming that the tanks 40 and 22 contain no water, the rocker arm 70 may be held in the elevated position of FIGS. 1 and 5 by the restraining action of the spring loaded balls 114, 114. If now the system is to be charged with water, the rocker arm 70 may be lowered manually to the FIG. 4 position, at which the restraining means becomes inoperative and the arm remains lowered, causing a corresponding lowering of float 42 and a displacement of inlet valve 90 to a fully open position. Water from supply pipe 10 will then pass through the inlet valve and passageway 102, and will enter float tank 40. By reason of the pipe connection 18, water will enter also the vaporization tank 22, and will seek a common level in both tanks 40 and 22.

As the level of water in tank 40 increases, water will enter the open bottom of the inverted cup-shaped chamber 64 to entrap air therein and within bore 62. Compression of the entrapped air by the rising level of water, will unseat the one-way ball check valve 58, permitting escape of air through the open upper end of tube 72, until water substantially fills the lower compartment 64, which may be referred to as the ballast compartment of the float. Then as the water level within the tank continues to rise, it will pass well above the level of dividing wall 48, exteriorly of the float, to render the float buoyant.

As the float continues to rise with the rising level of water in tank 40, it will finally elevate the rocker arm 70 to the upper limit of FIG. 5, causing the spring loaded balls 114, 114 to snap into the sockets 116, 116 as previously explained, this resulting in an abrupt full closing of inlet valve 90 to terminate the feed of water to tanks 40 and 22. It may here be noted that closing of the inlet valve is assisted by pressure of water in pipe 10 and bore 94. The level of water at the time of inlet valve closing may approximate the level denoted by line 36 upon FIG. 1.

As previously mentioned herein, vaporization or evaporation of water occurs in tank 22, thereby to lower the water level below line 36 in both tanks. This lowering of the water level does not concurrently lower the float 42, because the restraining action of the spring loaded balls 114, 114 yieldingly opposes downward displacement of rocker arm 70 from the upper limit depicted by FIGS. 1 and 5, thereby substantially delaying the rocker arm displacement, and consequently, the opening of inlet valve 90.

Continued lowering of the water level, with the dropping of float 42 under restraint by the restraining means 114, deprives the float of all its buoyancy, and meanwhile, the effective weight of the float is gradually increased by the weight of ballast water entrapped in the ballast chamber 64 of the float. That is, the entrapped water remains in the ballast chamber long after the float has lost its buoyancy due to substantial lowering of the water level in tank 40. Finally, the ballast in chamber 64 becomes effective to overcome the restraining influence of the spring loaded balls 114, 114, and the added weight of the ballast enforces an abrupt lowering of the float and rocker arm 70 according to the disclosure of FIG. 4. This results in a full opening of inlet valve 90, and repetition of the tank replenishment cycle above explained.

It may here be noted that the ballast of water in compartment 64 of the float, is held intact by ball check valve 58, and the level of the ballast water in compartment 64 may remain at a substantial elevation above the low level of water surrounding the float. This difference in elevation of water level inside and outside the float 42, is depended upon to supply the gravitational force necessary to overcome the force of the restraining means 114, 116, as the level of water in tanks 40 and 22 approaches a predetermined lower limit.

If for any reason the water ballast in compartment 64 is lost, as may result from a failure of water pressure at supply pipe 10 while float 42 is lowered, the ballast will be restored automatically upon resumption of the water pressure. That is, water rising in tank 40 will enter the open bottom of ballast compartment 64 as valve 58 releases entrapped air to atmosphere through tube 72. With restoration of the ballast, the float will function as previously explained herein, to control the movement of rocker arm 70 and valve 90.

In conclusion, it should be appreciated that the control device comprising the tank 40 and valve 90, may be used to control liquids other than water, and for purposes other than the humidification of heated air. For example, the device may be used for supplying measured quantities of a liquid to a batch tank, such as 22, from which the batch is subsequently discharged either slowly or rapidly.

In the operation of the device, the action of all movable parts is reduced to a minimum, resulting in a substantial reduction of wear and servicing attention. The device employs no small orifices to become clogged with scale or corrosion, and all vital parts are protected from atmospheric dirt and other foreign substances. The valves 90 and 58 are exposed to a minimum of wear, as is evident.

It should be understood that various modifications and changes may be made in the structural details of the device, within the scope of the appended claims, without departing from the spirit of the invention.

I claim:

1. A liquid level control device for repeatedly charging a batch receptacle with liquid from a supply source comprising a tank having an open top, a float within the tank, an inlet port in the tank and an outlet port near the bottom of the tank delivering liquid to the batch receptacle, a control valve operated by the movement of the float between upper and lower limits to open and closed positions controlling the flow of liquid from the supply source to the inlet port, the float comprising an open ended body having a partition therein dividing the body into upper and lower chambers, the partition having an opening therein and a valve body extending upwardly therefrom, the valve body covering the opening, a check valve in the valve body, a pipe extending upwardly from the valve body, a support bracket attached to an upper portion of the tank, a lever pivotally mounted on the support bracket, the pivot being near one end of the lever, the other end of the lever being pivotally connected to the pipe and thus to the float, a valve housing carried by the support bracket and having a liquid passageway therethrough, the control valve being movably mounted within the valve housing and in the passageway, the liquid supply source being connected to the valve housing at one end of the passageway and the inlet port being connected to the other end of the passageway, the control valve being pivotally connected to the lever intermediate the ends thereof, yieldable means coacting between the support bracket and the lever intermediate the pivotal connection with the valve and other end of the lever, whereby upon filling the tank and batch receptacle the air caught in the lower chamber by the rising liquid in the tank is allowed to flow through the valve body and pipe to atmosphere thus filling the lower chamber with liquid and when the upper limit of liquid in the tank is reached the control valve is closed, upon using the liquid from the batch receptacle and tank the float is maintained in the upper position by a ballast of liquid confined within the lower chamber until the weight of the float and ballast overcomes the yieldable means and allows the lever to fall thus opening the control valve to full open position where it is maintained until the upper limit of the liquid is reached.

2. The control device as specified by claim 1, wherein the liquid controlled is water, and the batch receptacle comprises an evaporating receptacle supported within a furnace casing in position to be heated by the combustion chamber thereof.

3. The control device as specified by claim 1, wherein the liquid controlled is water, and includes the batch receptacle; a pipe connecting the bottom portion of the batch receptacle with the bottom portion of the tank; means for supporting said bottom portions at a substantially common level to ensure maintenance of a common level of liquid in both the tank and the batch receptacle; said means for support of the batch receptacle comprising an outwardly directed flange thereon to overlie a portion of a furnace casing, and said batch receptacle having apertures formed therein adjacent to said flange, for release of vapor into the furnace casing.

4. The control device as specified in claim 1, wherein said yieldable means comprises a spring loaded ball and socket receptive thereof, said ball and said socket being carried one by the lever and the other by said support bracket, for registry one with the other in the upper limit position of the lever.

5. The combination as specified by claim 4, wherein the liquid controlled is water, and the batch receptacle comprises an evaporating receptacle supportive within a furnace casing in position to be heated by the combustion chamber thereof.

6. The combination as specified by claim 4, wherein the liquid controlled is water, and the combination includes the batch receptacle; means for support of the bottom portions of the batch receptacle and the tank at a substantially common level; a pipe connecting the bottom portion of the batch receptacle with the bottom portion of the tank, to ensure maintenance of a common level of liquid in both the tank and the batch receptacle; said means for support of the batch receptacle comprising an outwardly directed flange thereon to overlie a portion of a furnace casing, and said batch receptacle having apertures formed therein at a substantial distance above the bottom portion thereof, for release of vapor into the furnace casing.

7. The control device as set forth in claim 1, wherein the check valve is a one-way valve allowing the air to escape from the lower chamber and opposing gravitation of the ballast from the lower chamber upon lowering of the liquid level within the tank.

8. The control device as set forth in claim 1, wherein the batch receptacle is supported at the approximate level of the tank, a pipe connecting the outlet port to the bottom portion of the batch receptacle to ensure maintainance of a common level of liquid within the tank and receptacle.

9. The control device as set forth in claim 1, wherein the yieldable means comprises a bore within the lever, at least one ball in the bore, yielding pressure means within the bore applying a yielding pressure upon the ball to cause a portion of the ball to extend outwardly beyond the lever, means on the lever to adjust the yielding pressure means, at least one socket on the support bracket engaged by the ball to hold the lever in the upper limit position.

10. The control device as set forth in claim 9 wherein the yieldable means comprises two balls in the bore and having a portion of each ball extending outwardly of the lever, a spring means between the two balls forcing them in opposite directions in the bore and the means to adjust the yielding pressure of the spring being a screw threadingly mounted on the lever and extending into the bore and engaging the spring means to apply and relieve pressure on the spring means.

11. The control device as specified in claim 9 wherein the liquid controlled is water, and the batch receptacle comprises an evaporating receptacle supported within a furnace casing in position to be heated by the combustion chamber thereof.

12. The control device as set forth in claim 9 wherein the check valve is a one-way valve allowing the air to escape from the lower chamber and opposing gravitation of the ballast from the lower chamber upon lowering of the liquid level within the tank.

13. The control device as set forth in claim 9 wherein the batch receptacle is supported at the approximate level of the tank, a pipe connecting the outlet port to the bottom portion of the batch receptacle to ensure maintainance of a common level of liquid within the tank and receptacle.